(12) United States Patent
Crowe et al.

(10) Patent No.: US 8,821,972 B2
(45) Date of Patent: Sep. 2, 2014

(54) METHOD AND APPARATUS FOR APPLYING CUSHION GUM TO A TIRE CASING

(75) Inventors: David Allen Crowe, Anderson, SC (US); William Edward Cheek, Jr., Taylors, SC (US); Robert Young, Simpsonville, SC (US); Stephen Manuel, Flat Rock, NC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 809 days.

(21) Appl. No.: 12/935,511

(22) PCT Filed: Mar. 31, 2008

(86) PCT No.: PCT/US2008/058897
§ 371 (c)(1),
(2), (4) Date: Sep. 29, 2010

(87) PCT Pub. No.: WO2009/123610
PCT Pub. Date: Oct. 8, 2009

(65) Prior Publication Data
US 2011/0027477 A1 Feb. 3, 2011

(51) Int. Cl.
*B05D 5/10* (2006.01)
*B29C 47/02* (2006.01)
*B29C 47/92* (2006.01)
*B29D 30/54* (2006.01)
*B29C 47/00* (2006.01)
*B29K 7/00* (2006.01)

(52) U.S. Cl.
CPC ....... *B29C 47/026* (2013.01); *B29C 2947/9258* (2013.01); *B29D 2030/544* (2013.01); *B29C 2947/92885* (2013.01); *B29C 2947/92076* (2013.01); *B29C 2947/92152* (2013.01); *B29D 30/54* (2013.01); *B29D 2030/546* (2013.01); *B29C 2947/92142* (2013.01); *B29C 2947/926* (2013.01); *B29C 2947/92619* (2013.01); *B29C 47/92* (2013.01); *B29C 47/0021* (2013.01); *B29C 2947/92019* (2013.01); *B29C 2947/92571* (2013.01); *B29C 2947/92161* (2013.01); *B29C 2947/92514* (2013.01); *B29K 2007/00* (2013.01); *B29C 2947/92123* (2013.01); *B29C 2947/92533* (2013.01); *Y10S 156/909* (2013.01)
USPC .... 427/207.1; 427/208.2; 156/96; 156/405.1; 156/406.6; 156/909

(58) Field of Classification Search
USPC ........ 427/207.1, 208.2; 156/96, 405.1, 406.6, 156/909
See application file for complete search history.

(56) References Cited

U.S. PATENT DOCUMENTS 5,458,727 A  10/1995 Meyer
7,468,111 B2  12/2008 Chapman et al.
(Continued)

FOREIGN PATENT DOCUMENTS

DE  102 28 372 A1  2/2003
(Continued)

OTHER PUBLICATIONS

PCT/US2008/058897 International Search Report, Form PCT/ISA/210, dated Jun. 26, 2008, 2 pgs.
(Continued)

*Primary Examiner* — Michael Cleveland
*Assistant Examiner* — Xiao Zhao
(74) *Attorney, Agent, or Firm* — Hahn Loeser & Parks LLP; Bret A. Hrivnak, Esq.

(57) ABSTRACT

Methods, computer programs, and apparatus for applying a layer of cushion gum to a tire casing in preparation for the retreading of the tire casing, the steps of the methods including selecting one of a plurality recipes for applying cushion gum based on one of a size, model and shape of the tire casing; pressurizing the tire casing to a predetermined pressure based on the recipe; crushing the tire casing by an extruder head a predetermined percentage of the tire casing radius or a predetermined distance, the predetermined percentage based on the recipe; and extruding the cushion gum from the extruder head. The extruder head may be translatable by way of a screw drive.

15 Claims, 5 Drawing Sheets

(56) References Cited

U.S. PATENT DOCUMENTS

2004/0200579 A1 10/2004 Mory et al.
2004/0256057 A1 12/2004 Gridley et al.
2005/0194077 A1* 9/2005 Yap .......................... 152/209.6
2005/0279443 A1 12/2005 Chapman et al.

FOREIGN PATENT DOCUMENTS

| | | |
|---|---|---|
| EP | 0 528 683 A1 | 2/1993 |
| JP | 05-229034 A | 9/1993 |
| JP | 2006-508838 A | 3/2006 |
| WO | 2004/028779 A1 | 4/2004 |

OTHER PUBLICATIONS

PCT/US2008/058897 Written Opinion, Form PCT/ISA/237, dated Jun. 26, 2008, 6 pgs.
JP 05-229034 A—English abstract and machine translation obtained from Patent Abstracts of Japan (http://www19.ipdl.inpit.go.jp) accessed on May 30, 2012, 14 pages.
DE 102 28 372 A1—English abstract and machine translation obtained from Espacenet (http://worldwide.espacenet.com) accessed on May 31, 2012, 7 pages.
WO 2004/028779 A1—English abstract and machine translation obtained from Espacenet (http://worldwide.espacenet.com) accessed on May 31, 2012, 10 pages.

* cited by examiner

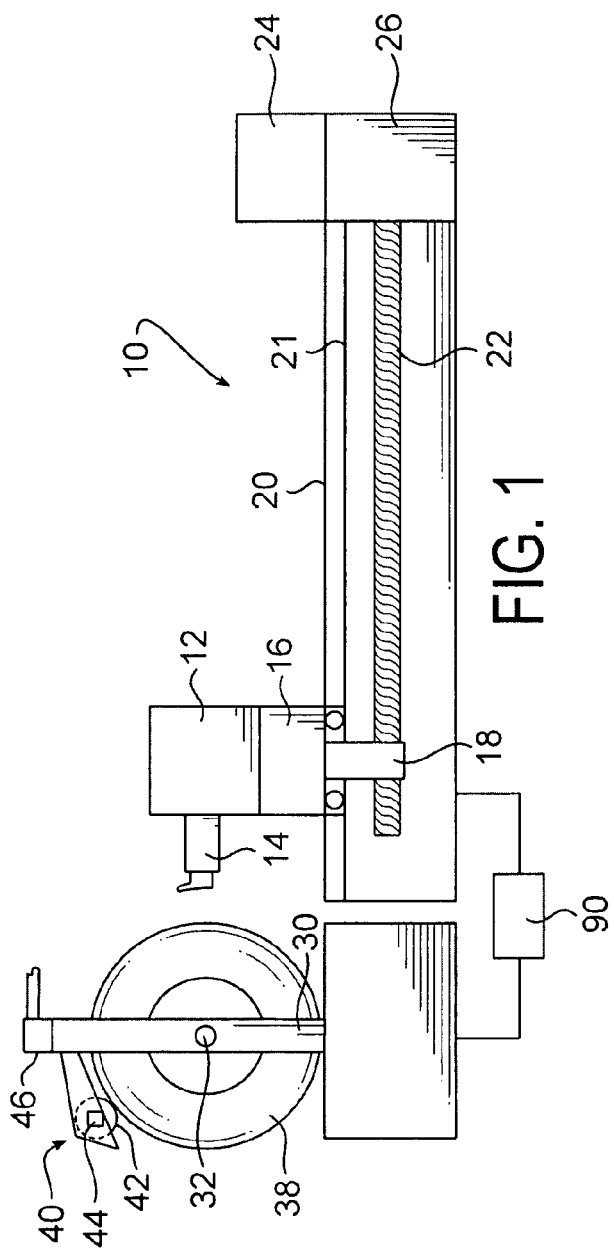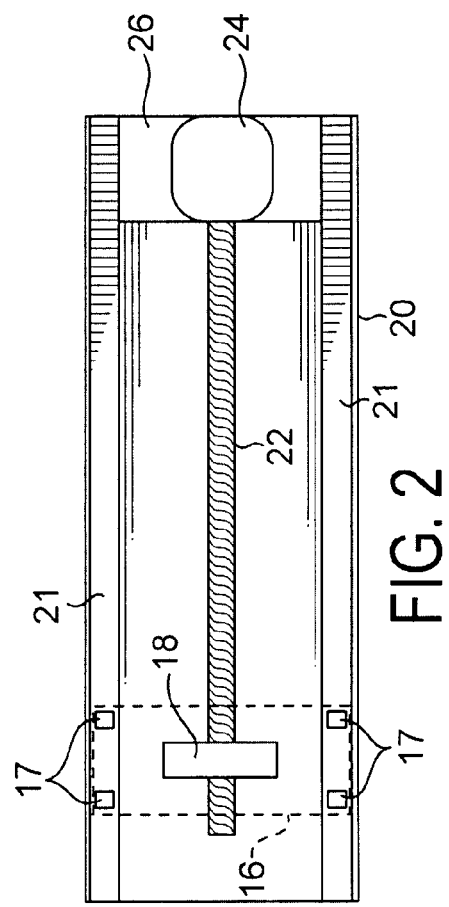

| Casing Width & Profile | Rim Diameter | Smear Distance in mm | Extrusion Stop Distance in mm | Casing Pressure x 10 | Crush Distance +25 mm | Buffing Recipe Circum-ference Avg. to determine speed during umd cycle | % of crush relative to sidewall |
|---|---|---|---|---|---|---|---|
| 8.25R | 20 | 92 | 25 | 11 | 42 | 2953 | 3.62% |
| 7.50R | 17 | 90 | 22 | 10 | 42 | 2600 | 4.11% |
| 9R | 22.5 | 92 | 25 | 11 | 45 | 2954 | 4.25% |
| 8R | 19.5 | 92 | 22 | 12 | 45 | 2584 | 4.86% |
| 9R | 17.5 | 90 | 22 | 10 | 45 | 2564 | 4.90% |
| 8.25R | 15 | 92 | 22 | 12 | 45 | 2557 | 4.91% |
| 9.5R | 17.5 | 92 | 22 | 10 | 45 | 2520 | 4.98% |
| 225/70R | 19.5 | 90 | 22 | 10 | 45 | 2463 | 5.10% |
| 235/85R | 16 | 90 | 22 | 10 | 45 | 2461 | 5.10% |
| 7.50R | 16 | 90 | 22 | 10 | 45 | 2450 | 5.13% |
| 215/85R | 16 | 90 | 22 | 10 | 45 | 2355 | 5.33% |
| 7.50R | 15 | 90 | 22 | 10 | 45 | 2310 | 5.44% |
| 12.00R | 24 | 85 | 20 | 11 | 57 | 3694 | 5.44% |
| 235/80R | 22.5 | 90 | 20 | 10 | 50 | 2880 | 5.45% |
| 225/75R | 16 | 90 | 22 | 10 | 45 | 2264 | 5.55% |
| 11.00R | 24 | 85 | 20 | 12 | 57 | 3608 | 5.57% |
| 14.00R | 20 | 85 | 20 | 12 | 59 | 3795 | 5.63% |
| 10.00R | 15 | 92 | 22 | 10 | 50 | 2775 | 5.66% |
| 11.00R | 22 | 85 | 20 | 11 | 57 | 3451 | 5.82% |
| 12R | 24.5 | 85 | 20 | 11 | 57 | 3426 | 5.87% |
| 425/65R | 22.5 | 90 | 10 | 11 | 57 | 3415 | 5.88% |
| 12.00R | 20 | 85 | 20 | 11 | 57 | 3414 | 5.89% |
| 10.00R | 22 | 85 | 20 | 11 | 57 | 3368 | 5.97% |
| 11R | 24.5 | 85 | 20 | 11 | 57 | 3356 | 5.99% |
| 10R | 17.5 | 92 | 22 | 10 | 50 | 2603 | 6.03% |
| 11.00R | 20 | 85 | 20 | 11 | 57 | 3287 | 6.11% |
| 12R | 22.5 | 85 | 20 | 11 | 57 | 3283 | 6.12% |
| 445/50R | 22.5 | 95 | 12 | 10 | 55 | 3070 | 6.14% |
| 385/65R | 22.5 | 90 | 14 | 11 | 57 | 3269 | 6.15% |
| 11R | 17.5 | 90 | 20 | 10 | 55 | 3048 | 6.18% |
| 295/80R | 22.5 | 90 | 18 | 12 | 57 | 3194 | 6.29% |

| Casing Width & Profile | Rim Diameter | Smear Distance in mm | Extrusion Stop Distance in mm | Casing Pressure x 10 | Crush Distance +25 mm | Buffing Recipe Circum-ference Avg. to determine speed during umd cycle | % of crush relative to sidewall |
|---|---|---|---|---|---|---|---|
| 245/75R | 22.5 | 92 | 22 | 12 | 54 | 2860 | 6.37% |
| 455/55R | 22.5 | 95 | 12 | 11 | 58 | 3225 | 6.43% |
| 305/75R | 22.5 | 90 | 20 | 12 | 57 | 3105 | 6.47% |
| 305/85R | 22.5 | 90 | 20 | 12 | 57 | 3105 | 6.47% |
| 285/75R | 24.5 | 90 | 20 | 11 | 58 | 3196 | 6.48% |
| 275/80R | 24.5 | 90 | 20 | 11 | 58 | 3192 | 6.49% |
| 12.75R | 22.5 | 85 | 20 | 11 | 59 | 3277 | 6.52% |
| 255/80R | 22.5 | 92 | 22 | 11 | 56 | 2960 | 6.58% |
| 365/80R | 20 | 90 | 18 | 12 | 60 | 3327 | 6.61% |
| 245/70R | 17.5 | 90 | 20 | 11 | 50 | 2365 | 6.64% |
| 305/70R | 22.5 | 92 | 20 | 12 | 57 | 3025 | 6.64% |
| 14/80R | 20 | 90 | 18 | 12 | 60 | 3304 | 6.65% |
| 245/75R | 16 | 90 | 22 | 11 | 50 | 2352 | 6.68% |
| 245/70R | 19.5 | 90 | 20 | 12 | 52 | 2539 | 6.68% |
| 295/75R | 22.5 | 92 | 16 | 12 | 58 | 3101 | 6.68% |
| 275/80R | 22.5 | 92 | 16 | 11 | 58 | 3093 | 6.70% |
| 305/75R | 24.5 | 85 | 20 | 11 | 60 | 3280 | 6.70% |
| 13/80R | 20 | 85 | 20 | 11 | 59 | 3163 | 6.75% |
| 11R | 22.5 | 92 | 22 | 13 | 60 | 3197 | 6.88% |
| 255/70R | 22.5 | 92 | 22 | 11 | 56 | 2828 | 6.88% |
| 285/70R | 19.5 | 90 | 5 | 11 | 55 | 2704 | 6.97% |
| 265/75R | 22.5 | 90 | 18 | 12 | 58 | 2943 | 7.04% |
| 275/70R | 22.5 | 90 | 20 | 12 | 58 | 2935 | 7.06% |
| 315/80R | 22.5 | 95 | 21 | 12 | 62 | 3283 | 7.08% |
| 10R | 22.5 | 92 | 18 | 12 | 60 | 3094 | 7.10% |
| 445/65R | 22.5 | 70 | 22 | 12 | 60 | 3508 | 7.16% |
| 305/70R | 19.5 | 90 | 5 | 11 | 65 | 2785 | 7.22% |
| 10.00R | 20 | 92 | 18 | 13 | 57 | 3197 | 7.27% |
| 265/70R | 19.5 | 90 | 20 | 13 | 62 | 2613 | 7.45% |
| 215/75R | 17.5 | 80 | 23 | 11 | 56 | 2348 | 7.49% |
| 9.00R | 20 | 92 | 22 | 12 | 62 | 3094 | 7.51% |

METHOD AND APPARATUS FOR APPLYING CUSHION GUM TO A TIRE CASING

This application is a National Stage application of PCT Application No. PCT/US2008/058897, filed Mar. 31, 2008, to which this application claims priority and the benefit of, the disclosure of which is also hereby incorporated by reference.

TECHNICAL FIELD

The invention relates to a method and apparatus for applying cushion gum to a tire casing.

BACKGROUND OF THE INVENTION

During the process of retreading a tire, cushion gum is applied to the tire casing after the old tread has been removed. The cushion gum functions as an adhesive between the tread and tire casing, such that after curing, the tread is fixed to the casing. Methods and devices for applying cushion gum to a tire casing are known that automatically apply cushion gum to a tire casing before the application of the new tread to the casing. Some prior art machines comprise a cushion gum extruder unit that translates horizontally relative to a sled. The prior art machines typically comprise an air-actuated system for moving the extruder in the direction of, and away from, the tire casing.

When applying the cushion gum to a tire casing, it is desirable to apply a layer of cushion gum uniformly and in such a manner that the cushion gum efficiently adheres to the tire casing surface. Lack of consistent application of cushion gum may result in treads that fail prematurely. Accordingly, one or more embodiments of the present invention are hereinafter described.

One problem with conventional cushion gum applicators is inconsistent and inaccurate application of cushion gum. Therefore, there is a need for an improved cushion gum applicator with increased consistency and accuracy in the application of the cushion gum.

SUMMARY OF THE INVENTION

Particular embodiments of the present invention include methods, computer programs, and apparatuses for applying cushion gum to a tire casing. Such application of cushion gum is performed during the retreading process after the old tread has been removed but before application of the new tread. Particular embodiments of methods of the present invention, that are methods of applying cushion gum to a tire casing have steps that include selecting one of a plurality recipes for applying cushion gum based on one of a size, model and shape of the tire casing; pressurizing the tire casing to a predetermined pressure based on the recipe; crushing the tire casing by an extruder head a predetermined percentage of the tire casing radius, the predetermined percentage based on the recipe; and extruding the cushion gum from the extruder head.

Other embodiments for applying cushion gum to a tire casing have steps that include providing a cushion gum applicator having a cushion gum extruder head and a tire casing mount; selecting one of a plurality recipes for applying cushion gum based on one of a size, model and shape of the tire casing; pressurizing the tire casing to a predetermined pressure based on the recipe; translating one of the tire casing mount and the extruder head a distance to contact the other, the distance being based on the recipe; and extruding the cushion gum from the extruder head.

Particular embodiments of the present invention include a cushion gum applicator comprising a cushion gum extruder having an extruder head; a tire casing mount for mounting and rotating a tire casing; a base for supporting the extruder, wherein the extruder translates relative to the base toward and away from the tire casing mount; and, a screw drive associated with the base and operably attached to the extruder, the screw drive translating the extruder relative to the base.

BRIEF DESCRIPTION OF THE DRAWINGS

FIG. 1 is a side view of an embodiment of a cushion gum applicator.

FIG. 2 is a top view of the cushion gum applicator of FIG. 1, shown without the tire mount portion and without the cushion gum extruder.

FIG. 6 is a table illustrating different cushion gum application recipes.

DETAILED DESCRIPTION OF THE DRAWINGS

Figure 3:
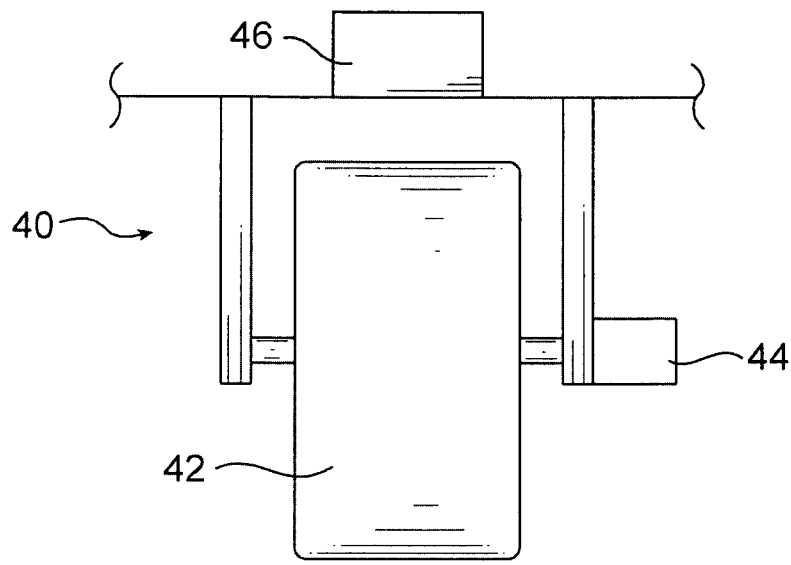
FIG. 3 is a front view of an encoder assembly and depth proximity sensor.

Particular embodiments of the present invention provide methods, computer programs, and apparatus for applying a layer of cushion gum to a tire casing in preparation for the retreading of the tire casing. A cushion gum applicator generally extrudes cushion gum onto a tire casing while the tire casing is rotating. After the cushion gum is applied to the tire casing, the cushion gum applicator or an adjacent machine applies a new tread to the tire casing.

Particular embodiments of the present invention include one or more steps for applying cushion gum to a tire casing. The steps may include selecting one of a plurality of recipes for applying cushion gum based on one of a size, model and shape of the tire casing 38. In one embodiment, the program is selected or entered into a controller 90 at a user-interface 98 by the operator before or after the tire casing 38 is installed onto the applicator 10. As different tires and tire casings have different sizes and other physical characteristics, by selecting a recipe or program unique to the particular tire or tire casing 38, the parameters of applying the cushion gum can be tailored to the specific tire casing 38. For example, the recipe may include a measure of the pressure to which the tire casing 38 is inflated or pressurized during application of cushion gum to the tire casing surface.

Further, the recipe may include an extrusion stop point, which is a point on the tire casing circumferential surface that extrusion of cushion gum ceases. The extrusion stop point can be calculated from an extrusion distance, which is a measure of a length about the tire casing 38 to which the cushion gum is extruded from an extruder head 14, or from a extrusion stop distance, which is the distance from the extrusion stop point to the extrusion start point around the remainder of the circumference, calculated by subtracting the extrusion distance from the circumference of the tire casing 38. Finally, the recipe may include a smear distance, which is a measure of the length about the tire casing 38 that the remaining cushion gum at the extruder head-tire casing interface is smeared onto the tire casing 38 to achieve an even distribution about the tire casing 38.

Figure 4:
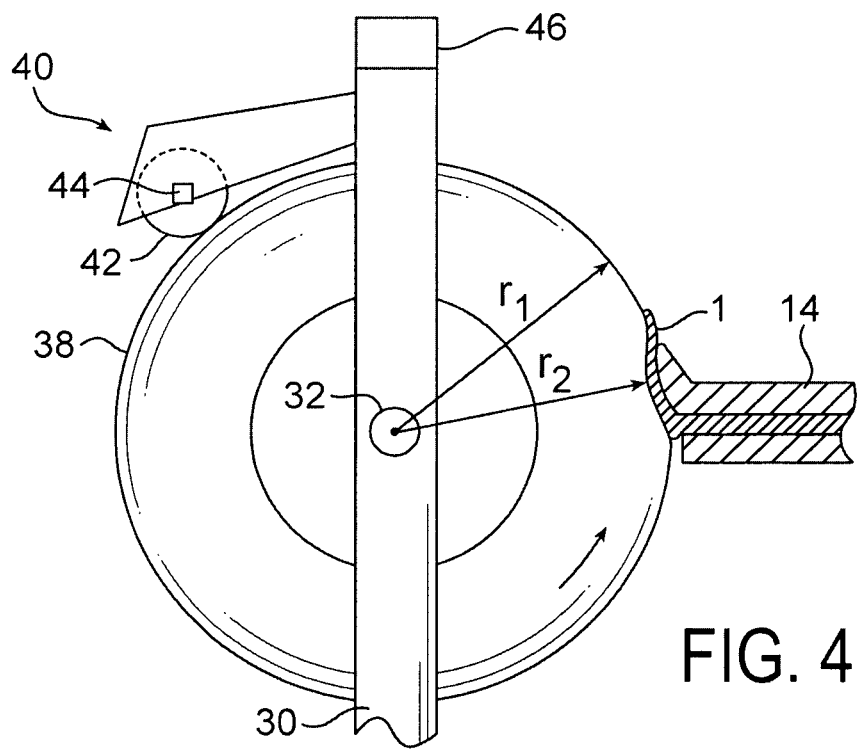
FIG. 4 is a side view of a tire casing mounted to a tire mount, shown with a portion of an extruder head in partial cross-section.

In a particular embodiment, the recipe also includes a measure of an amount that the extruder head crushes the tire casing during application of cushion gum, expressed as either a percent crush of the radius r1 of the tire casing 38 or a crush distance of the radius of tire casing 38. With reference to FIG. 4, the crush distance is calculated by subtracting r2 from r1. By selecting a recipe with parameters that are specific to the particular tire casing 38, it is contemplated that the cushion gum can be applied evenly about a tire casing 38 and consistently from tire casing 38 to tire casing 38. In particular embodiments, the percent crush of the radius r1 is maintained during the cushion gum application to within at least 10% of the crush distance indicated in the recipe or in alternate embodiments, within at least 5% or at least 3% of the crush distance indicated in the recipe. In particular embodiments, a screw drive or hydraulic drive is utilized to position the extruder head because these drives provide accurate control of the position of the extruder head and thus accurate control of the percent crush during the cushion gum application.

The methods may further include the step of pressurizing the tire casing 38 to a predetermined pressure based on the recipe. In an exemplary embodiment, the tire casing 38 may be quickly and partially inflated or pressurized by the machine 10 after the tire casing 38 is engaged with the applicator 10. This "quick inflation" may take a few seconds, and is performed so that the circumference of the tire casing 38 can be measured. In particular embodiments, the pressure is maintained within the tire casing 38 during the application of the cushion gum to within at least 10% of the pressure indicated in the recipe or alternatively within at least 5% or within at least 3% or at least 2% of the pressure indicated in the recipe. The pressure may be maintained during the application of the cushion gum to the tire casing by providing inflation air from the air supply in sufficient quantity to maintain the inflation pressure through, for example, a pressure controller that regulates the flow of inflation air with a control valve by sensing a pressure indicative of the inflation pressure and adjusting the control valve to maintain the inflation pressure to the pressure (set point) indicated in the recipe. Sufficient quantity of air must be supplied to at least replace the amount of air leaking from around hub on which the carcass is mounted.

After the tire casing 38 is partially inflated, the machine 10 may rotate the tire casing 38 one or more initial revolutions. During the initial revolution(s), the encoder assembly 40 measures the circumference of the tire casing 38. In a particular embodiment, the encoder assembly 40 includes an encoder wheel 42 that is removably engaged with the tire casing 38 such that the encoder wheel 42 rotates with the tire casing 38. The encoder 44 converts the rotation of the encoder wheel 42 into a measured circumference of the tire casing 38, and relays the information to the controller 90. The encoder also records the circumferential positioning of the tire casing 38, and relays the information to the controller 90.

As the tire casing 38 is initially rotating and the encoder 40 is measuring the circumference, two other processes are performed. The depth proximity sensor 46 measures the depth or thickness about the tire casing 38 of the remaining tread and other material left on the tire casing 38 above the belts. As the distance or depth from the sensor 46 to the bottom of wheel 42 is known, and the sensor 46 is continually measuring the distance from the sensor 46 to the belts, the controller 90 can calculate the thickness of the remaining tread and other material by subtracting the two values. In an exemplary embodiment, the point of thinnest material or low point is measured and its position is relayed to the controller, so that the tire casing 38 can be indexed for extrusion to start at the low point.

In addition to performing the depth proximity measurement, the applicator 10 fully inflates the tire casing 38 to the predetermined pressure during the initial revolution(s), the predetermined pressured being based on the particular recipe for the tire casing 38. In one particular embodiment, the predetermined pressure is maintained at least until cushion gum is fully applied to the tire casing 38. Because the tire casing 38 is inflated to a predetermined pressure based on the selected recipe and substantially maintained throughout application of cushion gum, the tire casing 38 provides a consistent and predictable resistance to the force exerted by the extruder head 14.

After the initial revolution(s) of tire casing 38 during which the circumference is measured; the thickness of the material above the belts is measured and relayed to the controller, along with the orientation of the tire casing 38; and the tire casing 38 is inflated to a predetermined pressure, the wheel 42 is removed from contact with the tire casing 38. The tire casing 38 is then indexed such that the low point or point of thinnest material above the belts is positioned to engage the extruder head 14.

The method may further include the step of crushing the tire casing 38 by an extruder head a predetermined percentage of the tire casing radius, the predetermined percentage based on the recipe. The method may include at least one of the tire mount 30 and the extruder head 14 translating toward the other, so that the extruder head 14 contacts the circumferential surface of the tire casing 38 and crushes the circumferential surface a predetermined distance or a predetermined percent of the tire casing radius. The crush distance/crush percent of the tire casing circumferential surface is based on the recipe selected by the operator. As illustrated in FIG. 6, a crush distance plus twenty five mm is indicated for each recipe, the extra twenty five mm being the distance that the extruder head travels before contacting the tire casing circumferential surface. By subtracting the twenty five mm, the crush distance can be determined.

As illustrated in the exemplary embodiment of a cushion gum applicator in FIGS. 1-2, the extruder 12 and extruder head 14 translate by way of a screw drive 22, as described below. In other embodiments, it is contemplated that the tire mount 30 may translate via a screw drive 22, or that both the tire mount 30 and extruder 12 translate by way of a screw drive. Other embodiments may utilize, for example, hydraulically operated drives to translate the extruder 12 and/or the tire mount 30.

In an exemplary embodiment for extruding cushion gum, the extruder 12 with extruder head 14 first translates from a resting or home position to a ready or preposition position. The ready position may be the same for all tire casing types, such as twenty five mm from the tire casing circumferential surfaces measured from the extruder head 14 to the circumferential surface of the tire casing 38. It is also contemplated that the extruder head may translate from a home position directly to an engaged position.

The extruder head 14 then translates from the ready position to the engaged position into contact with the tire casing 38 circumferential surface. The distance that the extruder head moves from the ready position (or home position) to the engaged position is based upon the selected recipe for the particular tire casing 38. To state it another way, the extruder head 14 crushes the circumferential surface of the tire casing 38 a predetermined distance (crush distance) or a predetermined percentage of the tire casing radius. In the exemplary embodiment, the ready position is 25 mm from the tire casing 38.

In a particular embodiment of the invention, the extruder head 14 moves a distance sufficient to crush the surface of the tire casing 38 from about two percent to about nine percent of the radius of the tire casing 38. In yet another embodiment, the percent crush of the tire casing 38 is about three percent to about eight percent of the radius of the tire casing 38. In terms of crush distance, the crush distance may be from about 15 mm to about 40 mm.

Figure 7:
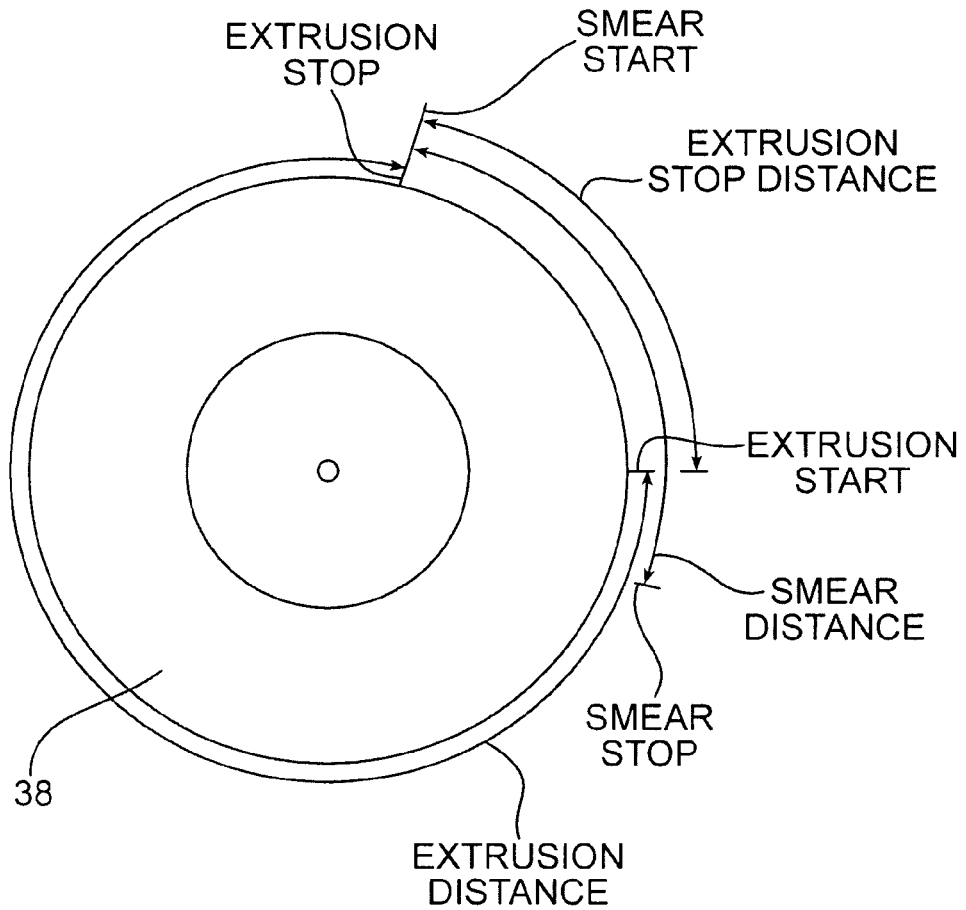
FIG. 7 is a schematic illustration of a tire casing with explanatory representation of extrusion terms.

The method may further include the step of extruding the cushion gum from the extruder head. As the tire casing 38 rotates, cushion gum is extruded from the extruder head 14 at a distance around the tire casing 38 based on the recipe. The volume and rate of cushion gum is based on the measured circumference. In one particular embodiment, as illustrated in FIG. 7, the cushion gum is extruded an "extrusion distance" less than three hundred sixty degrees around the tire casing 38, leaving an "extrusion stop distance" of the remainder of the circumference. The extrusion distance and extrusion stop distance are based on the recipe selected for the particular tire casing 38. The cushion gum at the tire casing 38-extrusion head 14 interface at the extrusion stop point is then smeared about the remainder of the tire casing circumference and past the extrusion start point, the total distance of smear from the smear start point to the smear stop point being the "smear distance." The smear distance, like the other measurements, is based on the recipe for the particular tire casing 38. As illustrated in FIG. 7, in one embodiment the smear distance extends past the extrusion start point to smooth over any cushion gum aberrations at the extrusion start point. After the cushion gum is fully applied, the new tread can be placed over the tire casing 38.

By correlating each step in the application of cushion gum to objective and/or measurable criteria, the accuracy and consistency of the cushion gum layer is increased, with substantially even thickness of cushion gum about the circumferential surface. In other words, by selecting a recipe that is based upon the particular tire casing 38, by inflating the tire casing 38 to a predetermined pressure based upon the recipe and maintaining the pressure throughout application of the cushion gum, and by moving the extruder head 14 into contact with the tire casing circumference with a consistent crush distance/percent crush, the accuracy and consistency of the cushion gum layer is increased. Additionally, as the volume and rate of cushion gum extrusion, and/or rotation of the tire casing 38 is dependent upon the measured circumference of the particular tire casing 38, the accuracy and consistency of the cushion gum layer is increased. The more consistent and uniform that the cushion gum is applied to the tire casing 38, the better the tread may adhere to the tire casing 38 during curing of the tire casing 38.

The methods described herein may be employed by a cushion gum applicator and embodied in computer software. The methods and the manner in which they are employed or practiced in exemplary embodiments are discussed in further detail below.

An embodiment of a cushion gum applicator, generally identified by reference number 10, is illustrated in FIG. 1-4. Cushion gum applicator 10 includes an extruder 12 having an extruder head 14. The extruder head 14 engages the tire casing 38 and extrudes cushion gum onto the casing 38. The extruder 12 may be translatably attached to a base or sled 20, such as by base mount 16. Base mount 16 may therefore engage base 20, and, in one embodiment, is translatable horizontally relative to base 20. The engagement of base mount 16 to base 20 may comprise any of a plurality of translating connections known in the art. In an exemplary embodiment, base mount 16 may comprise a plurality of rollers 17 that engage complementary a track or grooves 21 in the base 20. Alternatively, it is contemplated that any of a plurality of other engagement mechanisms can be used.

In one particular embodiment, the mount 16 is translatable relative to base 20 by way of a screw or threaded drive member 22. Screw drive 22 may be engaged with, for example, attachment member 18. Attachment member 18 may be fixed relative to base mount 16 and may include a threaded aperture therethrough that receives screw drive 22. As the screw drive 22 rotates relative to attachment member 18, base mount 16 and base member 18 translates relative to base 20. It is contemplated that the screw drive 22 can be driven by a motor 24 that includes appropriate features such as variable speed and reversible drive directions. Motor 24 may be connected to screw drive by any known means, such as a gear box 26. Gear box 26 may include one or more gears to transfer and/or convert the rotational output of the motor 24 to the screw drive 22. It is contemplated that gear box 26 may include gears that also adjust the torque and/or speed of the motor output and may include, for example, worm gears, spider gears, reduction gears, or any other gears known in the art. Motor 24 may also be connected to a computer or controller 90, as will be described below.

A tire mount 30 is located near base 20. The tire mount 30 may comprise a spindle or axle member 32 that engages and supports the tire casing 38 and associated wheel. Tire mount 30 also rotates the tire casing 38 relative to the extruder head 14, as known in the art. As the tire casing 38 rotates in close proximity with or in contact with extruder head 14, the extruder head 14 applies cushion gum to the exterior circumferential surface of the tire casing 38, as described above. The tire mount 30 may therefore comprise means for rotating the tire casing 38, such as, for example, an exterior motorized wheel that contacts an outer surface of the tire casing 38, or a motorized spindle or axle 32 that engages the rim or wheel, as are known in the art.

In one or more methods for applying cushion gum to the tire casing 38, as described above, it is contemplated that the tire casing 38 is pressurized prior to application of cushion gum. In an exemplary embodiment, tire mount assembly 30 is associated with a pressurized air assembly suitable for selectively inflating and/or deflating the tire casing 38 mounted on the tire mount 30.

In yet another embodiment, tire mount 30 may be associated with an encoder assembly 40. Encoder assembly 40 may be used to measure the circumference of the tire casing 38 engaged with the tire mount 30. In some circumstances, it may be advantageous to measure the circumference of the tire casing 38 to predetermine the amount and/or rate of cushion gum to be applied to the tire. An exemplary encoder assembly 40 may include a wheel 42 that removably contacts the engaged tire 38 and rotates as the tire casing 38 is rotated. The encoder assembly 40 may comprise an encoder 44 to convert the radial distance that the wheel 42 rotates into a linear measurement of the circumference of the tire 38, upon one or more revolutions of the tire casing 38.

In addition to measuring the circumference of the tire casing 38, the tire mount 30 may be associated with a depth proximity sensor 46 to measure the depth of the material remaining on the tire casing 38 above the belts after the old tread has been removed. As can be appreciated, tire casings 38 may have high spots and low spots after the tread is cut or buffed away. In some circumstances, it may be advantageous to identify such high and low spots in an effort to apply the cushion gum properly and evenly.

Figure 5:
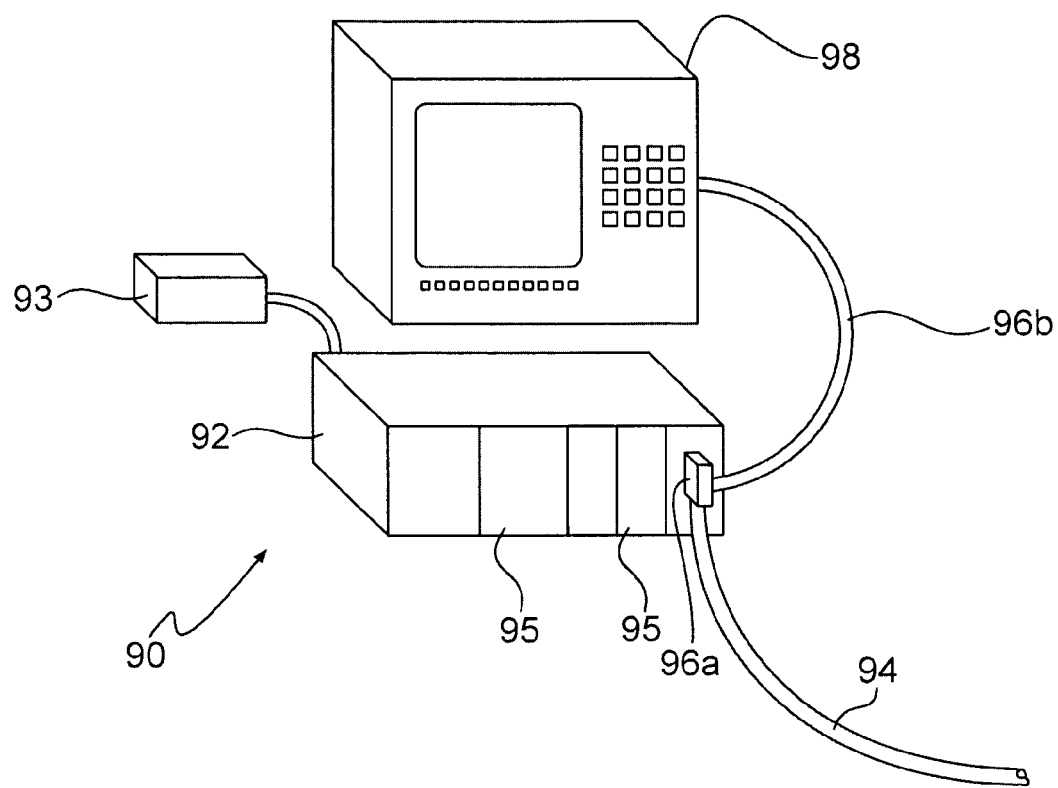
FIG. 5 is a schematic view of a programmable logic controller system that may be used with a cushion gum applicator.

With reference to FIG. 5, cushion gum applicator 10 may include a programmable logic controller 90, or other device having a processor that can execute programmed instructions, such as, for example, a personal computer or main frame computer. Cushion gum applicator 10 may also include a user interface 98. Controller 90 may include a logic processor 92 (which may be a microprocessor), a memory storage device 93, such as RAM (random access memory), ROM (read-only memory), PROM (programmable read-only memory), and at least one input/output (I/O) cable 94 for communicating with cushion gum applicator 10. Further, controller 90 may include an I/O slot 95 for housing an I/O card having I/O cable connector 96. An operator may utilize a user-interface 98 to control or instruct the operation of controller 90 and cushion gum applicator 10, which includes performing each step, method, and/or calculations associated with applying cushion gum as detailed herein. It is contemplated that the controller 90 may be programmed with customized recipes to apply cushion gum for different tire casing types, based on the model, size, and/or shape of the tire casing 38. An operator may therefore select a particular recipe based on the tire casing 38 to be installed onto the cushion gum applicator 10. User-interface 98 and controller 90 may communicate by way of I/O cable 96. It is also contemplated that wireless communications may exist between controller 90, user-interface 98, and cushion gum applicator 10. Generally, controller 90 may be programmed by any known graphical or text language. Programmed instructions, data, input, and output may be stored in a memory storage device 93, which is accessible to processor 92. Memory device 93 may comprise any commercially known storage device, such as such as hard disk drives, optical storage devices, flash memory, and the like. Processor 92 executes programmed instructions and may perform the instructions and any calculations and/or measurements useful for controlling cushion gum applicator 10 and performing the methods and operations discussed herein. Memory storage device 93 also stores inputs, outputs, and other information, such as, the geometry of the tire casing 38, the desired speed of rotation for the tire casing 38, and the rotation and translation of head 30.

While this invention has been described with reference to particular embodiments thereof, it shall be understood that such description is by way of illustration and not be way of limitation. Accordingly, the scope and content of the invention are to be defined only by the terms of the appended claims.

The invention claimed is:

1. A method of applying cushion gum to a tire casing, comprising the steps of:
   selecting one of a plurality of recipes for applying cushion gum based on one of a size, model and shape of the tire casing, the plurality of recipes providing one or more combinations of one or more predetermined pressures, extruder crush distances, extruder stop distances, and extruder smear distances for applying cushion gum to a tire casing;
   pressurizing the tire casing to a predetermined pressure based on the selected recipe;
   crushing the tire casing with an extruder head a predetermined amount of the tire casing radius, the predetermined amount based on the selected recipe;
   extruding the cushion gum from the extruder head onto the tire casing and about the tire casing circumference to a predetermined stop distance less than three hundred sixty degrees about the tire casing as the tire casing rotates and as the tire casing is crushed according to the step of crushing, the predetermined extrusion stop distance being based upon the selected recipe;
   the method further comprising the step of smearing the cushion gum remaining at an extruder head-tire casing interface at least about the remainder of the tire casing circumference by a predetermined smear distance based upon the selected recipe, the step of smearing being performed after the step of extruding about the tire casing circumference to a predetermined stop distance.

2. The method of claim 1, wherein the step of crushing includes translating one of the tire casing and the extruder head towards the other to crush the tire casing.

3. The method of claim 2, wherein the extruder head or the tire casing translates by a screw drive.

4. The method of claim 3, wherein the extruder head translates.

5. The method of claim 1, wherein,
   the tire casing is crushed from about two percent to about ten percent of the tire casing radius based upon the recipe selected.

6. The method of claim 1, wherein,
   the tire casing is crushed from about three percent to about eight percent of the tire casing radius based upon the recipe selected.

7. The method of claim 1, further comprising the steps of:
   measuring a circumference of the tire casing, and
   calculating parameters for applying the cushion gum, the parameters being based on the measured circumference.

8. The method of claim 7, wherein the parameters include at least one of the cushion gum volume, rate of rotation of the tire casing, and rate of extrusion of the cushion gum.

9. The method of claim 7, further comprising the step of:
   partially inflating the tire casing to a pressure less than the predetermined pressure prior to measuring the circumference of the tire casing, the step of measuring the circumference initiating while the tire casing is partially inflated, where the step of pressurizing proceeds from the partially inflated tire casing.

10. The method of claim 9, where the tire casing is partially inflated to a pressure within at least 10% of the predetermined pressure.

11. The method of claim 7, wherein the step of measuring the circumference of the tire casing is performed by an encoder associated with a wheel, the wheel selectively engaging the tire casing and rotating with the tire casing.

12. The method of claim 1, further comprising the step of:
   substantially maintaining the predetermined tire casing pressure during extrusion of the cushion gum.

13. The method of claim 1, further comprising the steps of:
   measuring a circumference of the tire casing;
   measuring a thickness of material above any tire casing belts about the circumference of the tire casing;
   determining the thinnest portion of the material based upon the thickness of material measured in the step or measuring a thickness of material; and,
   indexing the tire casing to initiate the application of cushion gum to the tire casing in step of extruding generally at the thinnest portion of the material thickness.

14. A method of applying cushion gum to a tire casing, comprising the steps of:
   providing a cushion gum applicator having a cushion gum extruder head and a tire casing mount;
   selecting one of a plurality recipes for applying cushion gum based on one of a size, model and shape of the tire casing, the plurality of recipes providing different predetermined pressures, extruder crush distances, extruder stop distances, and extruder smear distances for applying cushion gum to a tire casing;

pressurizing the tire casing to a predetermined pressure based on the selected recipe;

translating one of the tire casing and the extruder head a distance to contact the other, the distance being based on the selected recipe; and, extruding the cushion gum from the extruder head directly onto the tire casing and about the tire casing circumference to a predetermined stop distance less than three hundred sixty degrees about the tire casing as the tire casing rotates, the predetermined extrusion stop distance being based upon the selected recipe;

the method further comprising the step of smearing the cushion gum remaining at an extruder head-tire casing interface at least about the remainder of the tire casing circumference by a predetermined smear distance based upon the selected recipe, the step of smearing being performed after the step of extruding about the tire casing circumference to a predetermined stop distance.

15. The method of claim 14, wherein, the tire casing is crushed during the step of crushing by the extruder head from about two percent to about ten percent of the tire casing radius based upon the selected recipe.

* * * * *